Feb. 16, 1954   J. S. KAMBORIAN ET AL   2,668,967
TOE LASTER
Filed Aug. 20, 1948   9 Sheets-Sheet 6

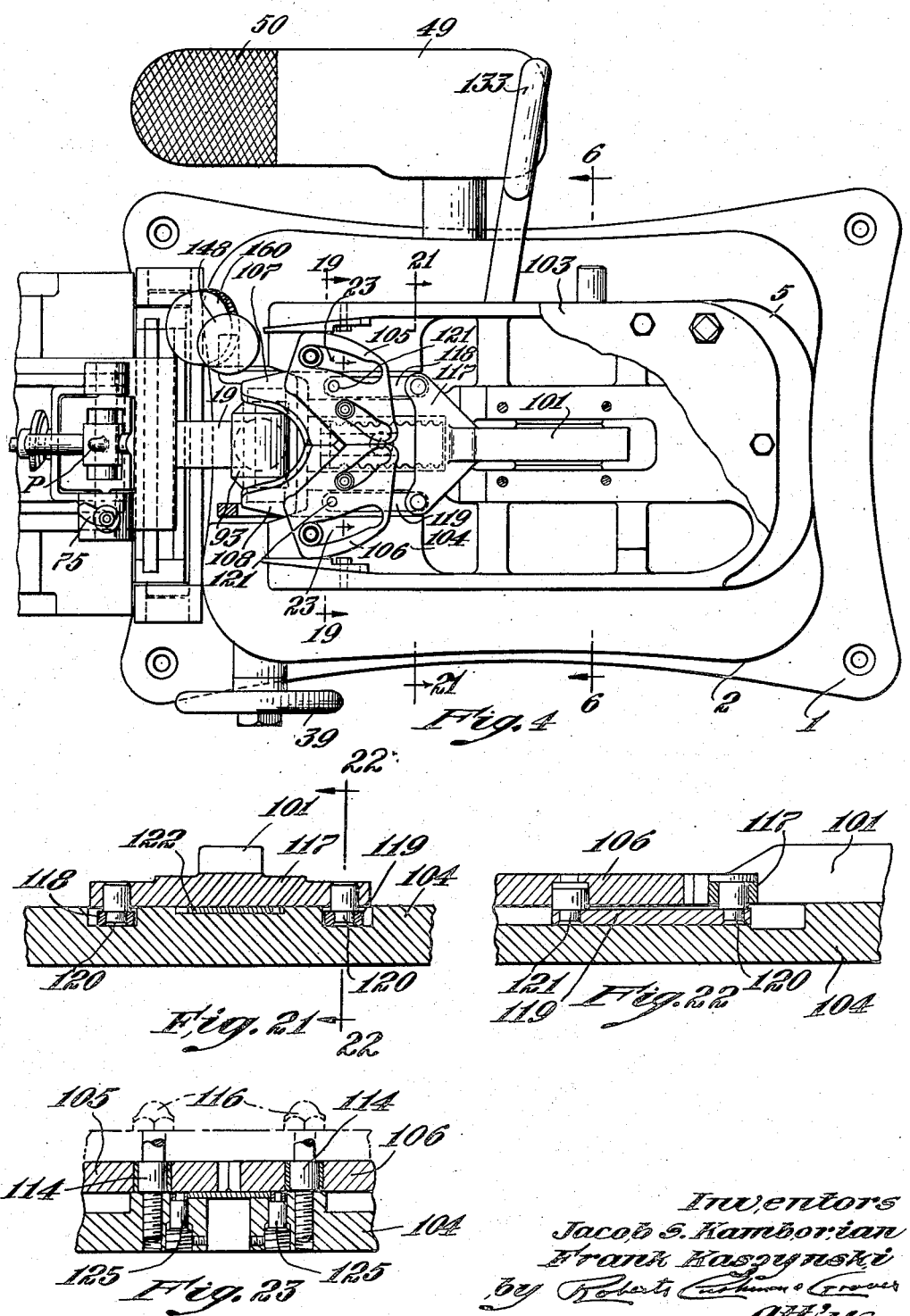

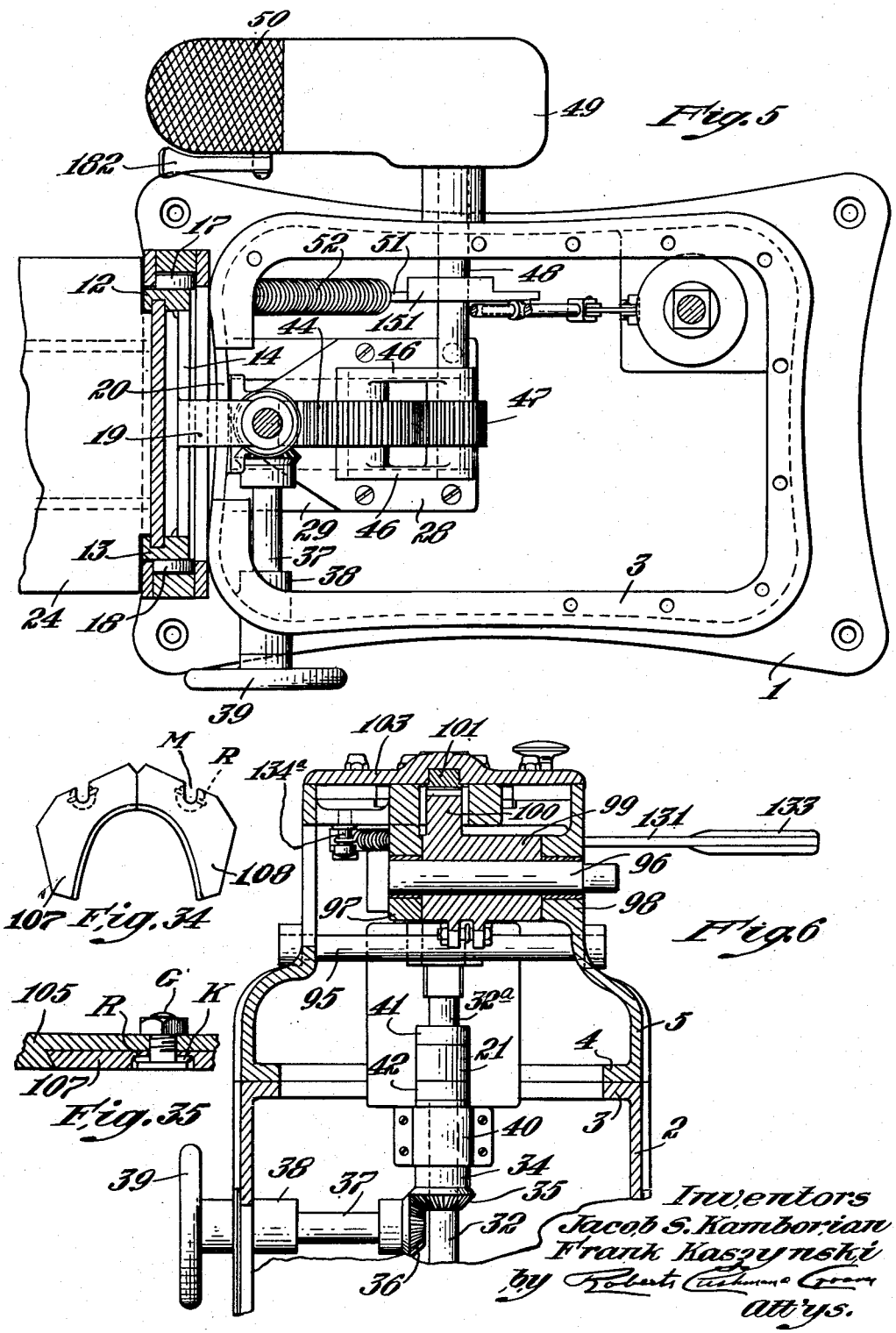

Inventors
Jacob S. Kamborian
Frank Kaszynski
by Roberts Cushman Grover
Att'ys.

Feb. 16, 1954 — J. S. KAMBORIAN ET AL — 2,668,967
TOE LASTER
Filed Aug. 20, 1948 — 9 Sheets-Sheet 7
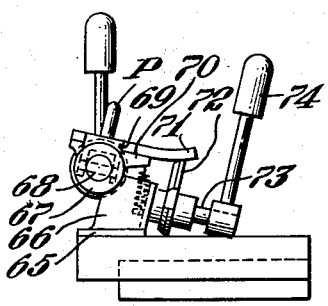
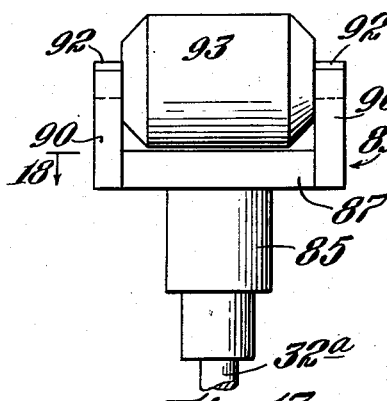
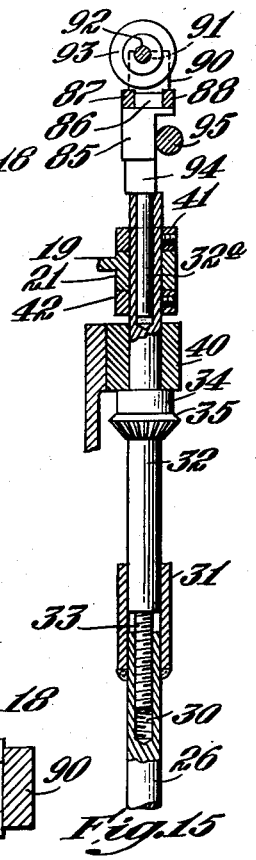
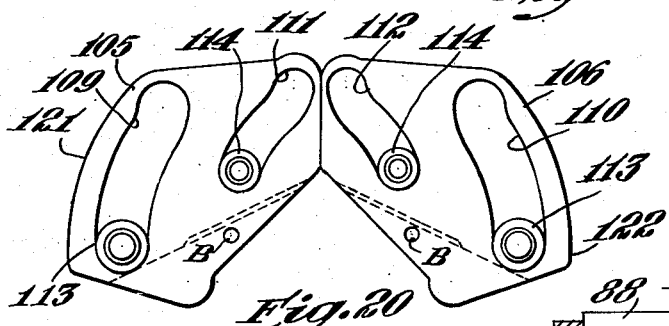
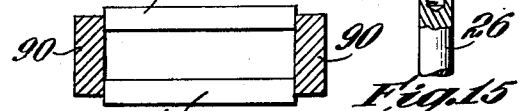
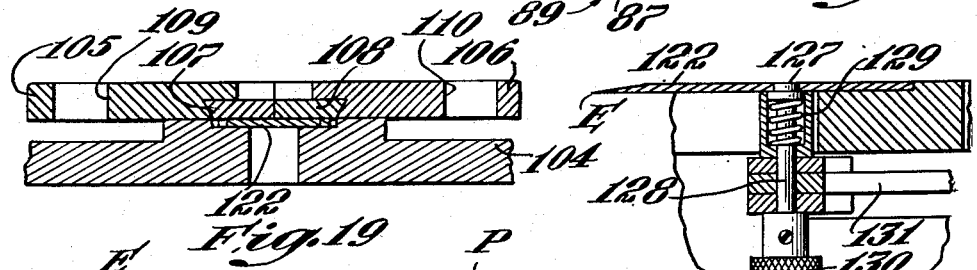
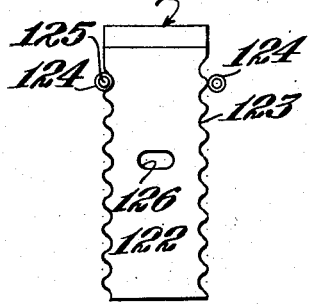
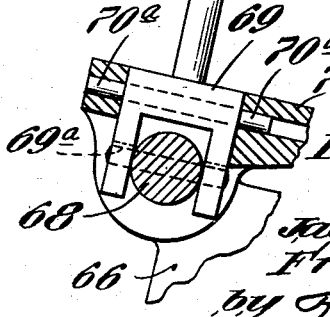
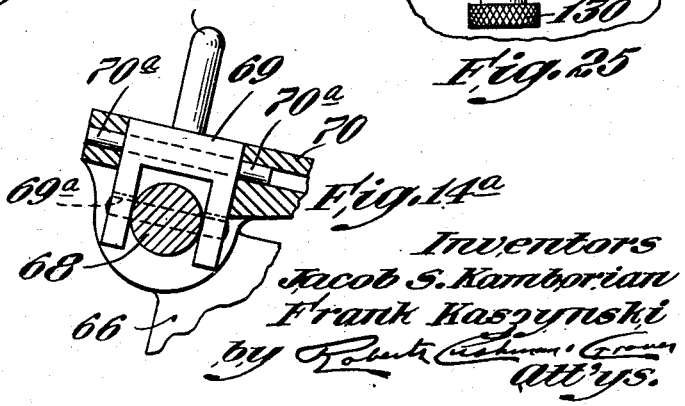
Inventors
Jacob S. Kamborian
Frank Kaszynski
by Roberts Cushman Grove
Att'ys.

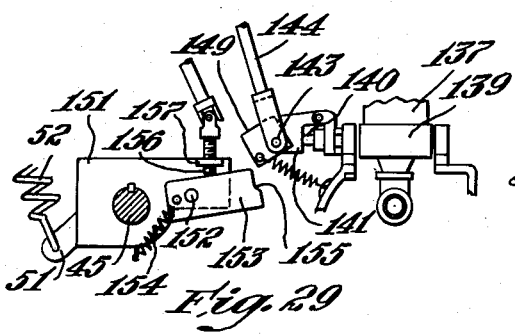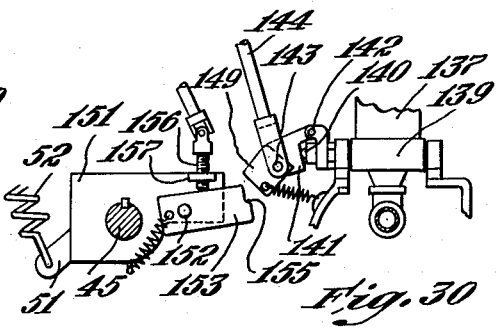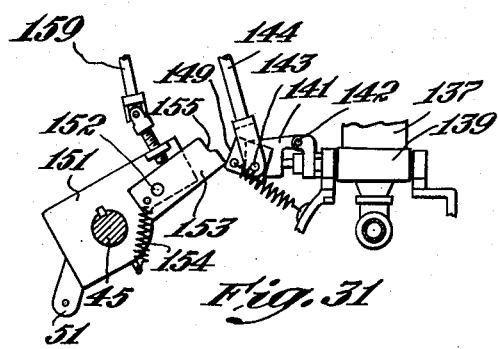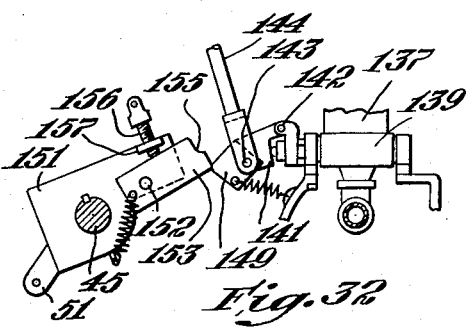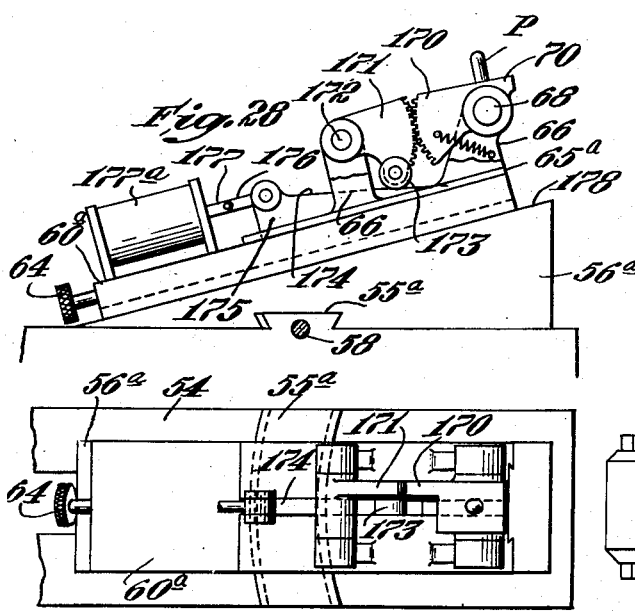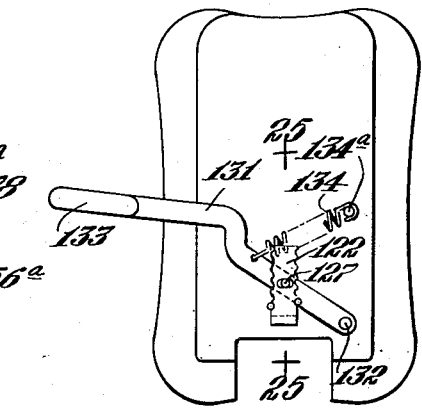

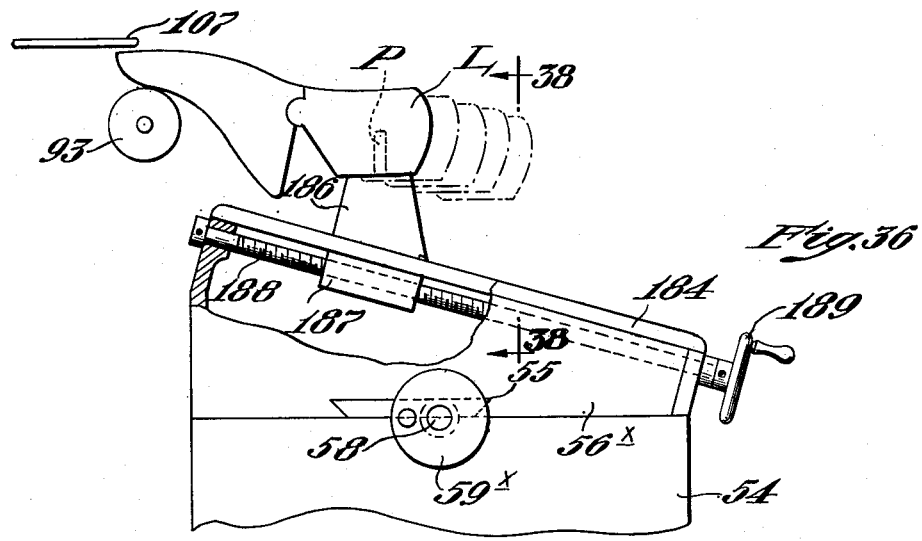
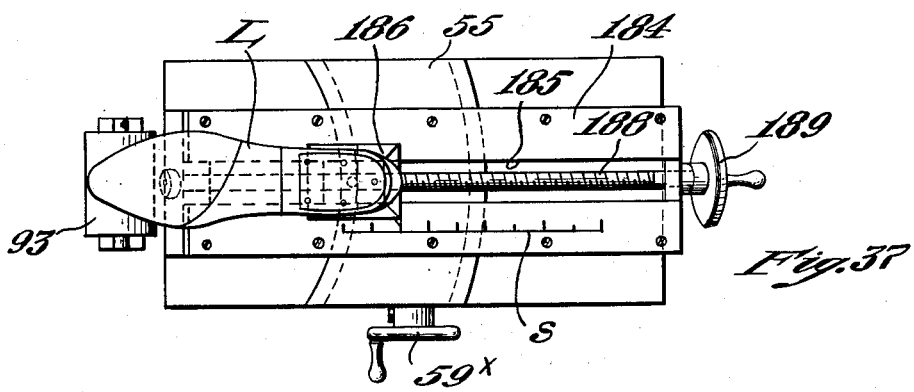
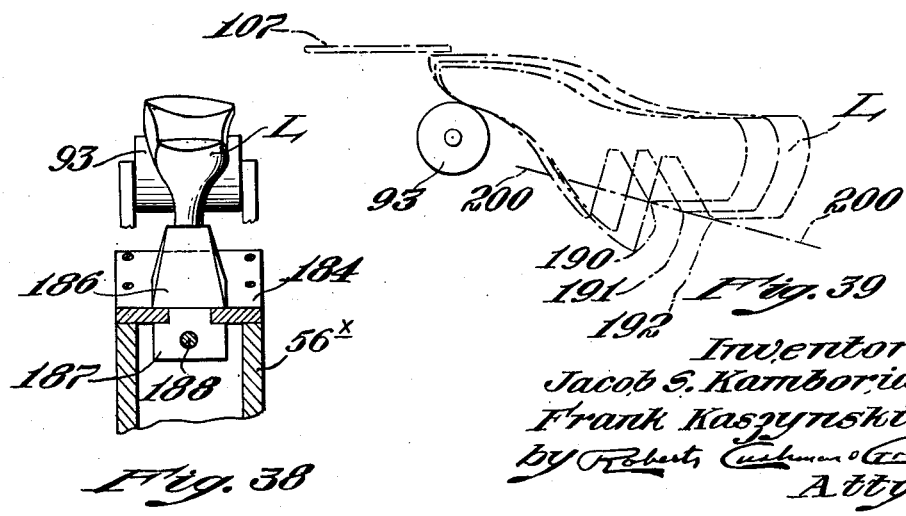

Patented Feb. 16, 1954

2,668,967

UNITED STATES PATENT OFFICE 2,668,967

TOE LASTER

Jacob S. Kamborian, West Newton, and Frank Kaszynski, Wilmington, Mass.; said Kaszynski assignor to said Kamborian Application August 20, 1948, Serial No. 45,225

32 Claims. (Cl. 12—12.4)

This invention pertains to lasting machines and more especially to a machine for lasting the toe end of a shoe.

A commercial lasting machine must be capable of lasting shoes of a wide range of sizes and styles and for this reason it is necessary to provide for a complex relative adjustment of the wipers and shoe support preparatory to the performance of the actual lasting operation. Customary prior practice in the design of such toe lasting machines has been to provide the shoe support with a relatively simple type of adjustment, and to embody substantially all of the other adjustments in the support for the wipers. The wipers themselves, when once properly positioned relatively to the shoe, have a comparatively simple motion but must be capable of exerting substantial force in their own plane for the inwiping and must also be capable of exerting great force in a direction perpendicular to the shoe bottom in order to flatten the lasting margin as it is wiped inwardly. The customary prior practice of mounting the wiper support for such adjustment necessitates the use of intricate and expensive mechanism for transmitting the lasting movements and pressures to the wipers.

Customarily, the operator is required to trim away surplus upper material at the toe by means of a hand-manipulated implement subsequent to the lasting operation, but the use of an unguided cutting implement for this purpose often results in damage to the shoe.

One object of the invention is to provide a toe lasting machine of simple, relatively inexpensive design in which the means for transmitting operative movement to the wipers is rugged, but simple, and having guided trimming means operative to trim away surplus stock without danger of damage to the shoe and so as to obtain substantially uniform results. A further object is to provide a machine wherein the wiper support is substantially immovable, all of the required relative adjustments of the shoe and wipers being obtained by adjustment of the shoe. A further object is to provide a toe lasting machine which is easy to operate and which comprises relatively few parts as compared with most commercial lasting machines. A further object is to provide a toe lasting machine which is rapid in action, which enables the operator to adjust the shoe most advantageously for inwiping and having provision for the power actuation of the wipers. Other and further objects and advantages of the invention will be pointed out in the following more detailed description and by reference to the accompanying drawings wherein:

Fig. 4 is a fragmentary plan view of the machine with a portion of the top cover plate broken away to show the interior;

Fig. 5 is a horizontal section on the line 5—5 of Fig. 3;

Fig. 6 is a fragmentary vertical section substantially on the line 6—6 of Fig. 4;

Fig. 14 is a side elevation of the last-supporting jack;

Fig. 14a is a fragmentary, front-to-rear vertical section through the last-supporting jack to larger scale;

Fig. 15 is a fragmentary vertical section showing details of the post which supports the toe rest;

Fig. 17 is a fragmentary front elevation of the toe rest and its supporting post;

Fig. 18 is a fragmentary section on the line 18—18 of Fig. 17;

Fig. 19 is a fragmentary vertical section, to larger scale, on the line 19—19 of Fig. 4;

Fig. 20 is a plan view of the wiper actuators;

Fig. 21 is a fragmentary vertical section, to larger scale, on the line 21—21 of Fig. 4;

Fig. 22 is a fragmentary vertical section on the line 22—22 of Fig. 21;

Fig. 23 is a fragmentary vertical section on the line 23—23 of Fig. 4;

Fig. 24 is a diagrammatic plan view illustrating the means for actuating the trimming knife;

Fig. 25 is a vertical section to larger scale on the line 25—25 of Fig. 24;

Fig. 26 is a plan view of the trimming knife;

Fig. 27 is a fragmentary side elevation illustrating a modified form of last-supporting jack;

Fig. 28 is a side elevation illustrating another form of last-supporting jack;

Figs. 29 to 32, inclusive, are diagrammatic views illustrating the mode of operation of the wiper-actuating devices;

Fig. 33 is a fragmentary plan view of the last-supporting jack and the toe support, showing a modified arrangement of parts for adjusting the jack;

Fig. 34 is a fragmentary plan view of the wipers, showing the slots which receive the studs for attaching them to the actuators;

Fig. 35 is a fragmentary vertical transverse section showing the stud which connects the actuator and wiper;

Fig. 36 is a fragmentary side elevation, partly in vertical section, showing one desirable form of last-supporting jack in association with other parts of the toe-lasting machine;

Fig. 37 is a plan view of the jack shown in Fig. 36;

Fig. 38 is a fragmentary vertical section substantially on the line 38—38 of Fig. 36; and Fig. 39 is a diagrammatic side elevation showing the relation of lasts of a series of consecutive sizes with reference to the wipers and toe rest of the last machine.

Figure 3:
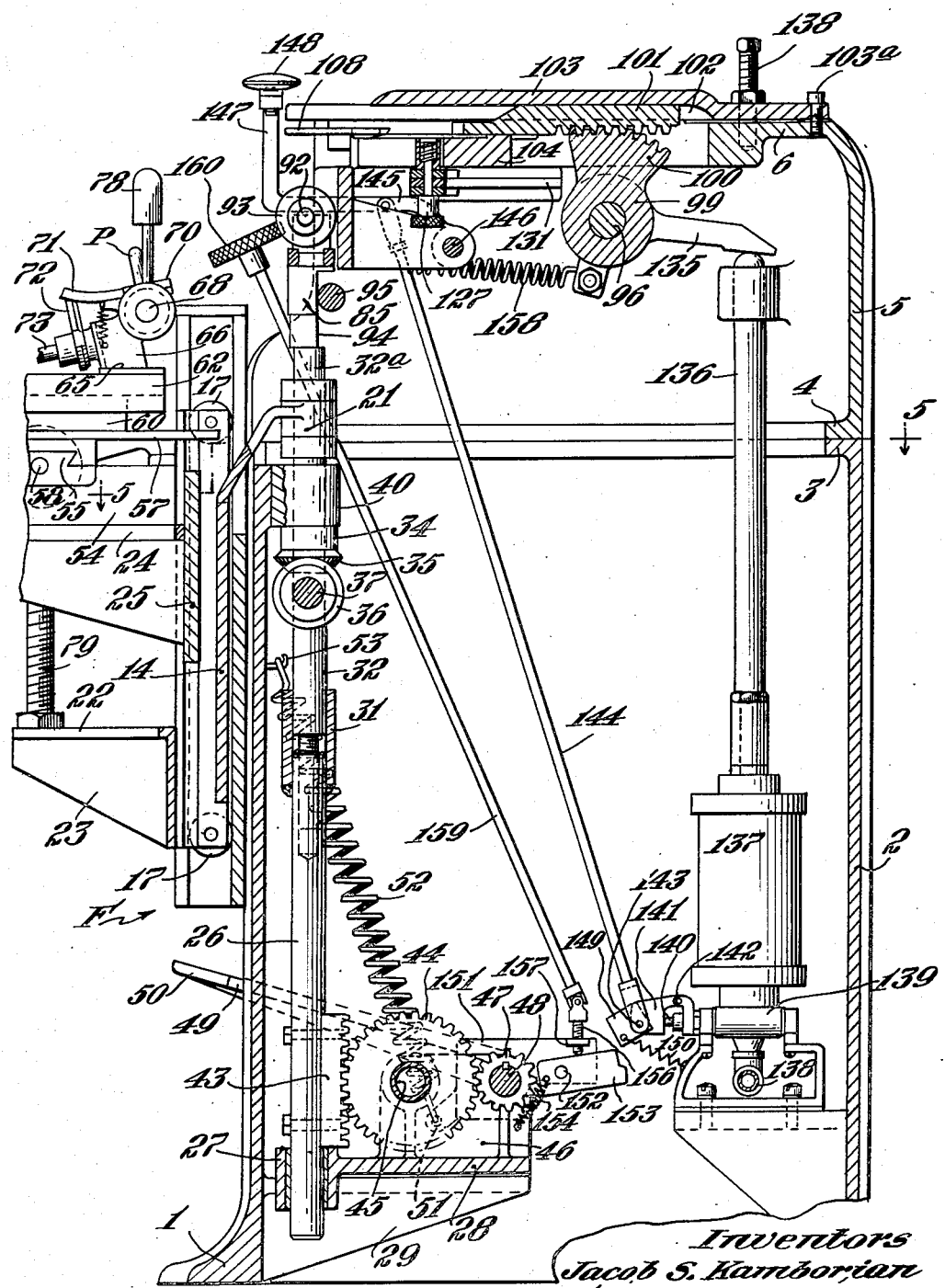
Fig. 3 is a fragmentary vertical section substantially on the line 3—3 of Fig. 1.

The frame of the machine, as disclosed in the drawings, comprises a base 1 of substantial horizontal extent designed to rest upon the floor and to provide a firm and steady support for the operative mechanism. From this base rises the hollow column 2 which, as illustrated, is integral with the base, the base and column being, for example, a metal casting. As illustrated, the base and column, in horizontal section, are of generally rectangular contour, the vertical side walls of the column being slightly concave and intersecting at smoothly rounded corners. As shown, the base and column are of substantially greater dimensions from front to rear than from side to side. The column has a large opening at its top bounded by the horizontal flange 3 (Fig. 3) and this flange supports an inwardly directed bottom flange 4 of a hollow cap or cover 5, having a substantially horizontal top wall 6. While the above described frame is desirable, it is to be understood that the particular shape and dimensions of the frame are not essential to the invention but that any suitable supporting structure may be employed for holding the operating parts in proper relation.

Figure 7:
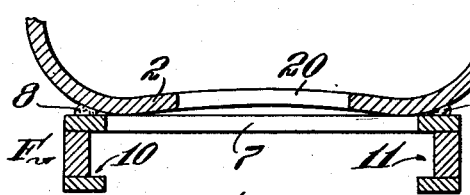
Fig. 7 is a fragmentary horizontal section on the line 7—7 of Fig. 1.

A vertical guide frame F (Figs. 2, 3 and 7) is secured to the front wall of the column 2. This frame comprises a rear plate 7 which is secured, for example, by welding at 8 and 9 (Fig. 7) to the front wall of the column and which supports guide members at its opposite lateral edges defining the vertical guideways 10 and 11.

Figure 8:
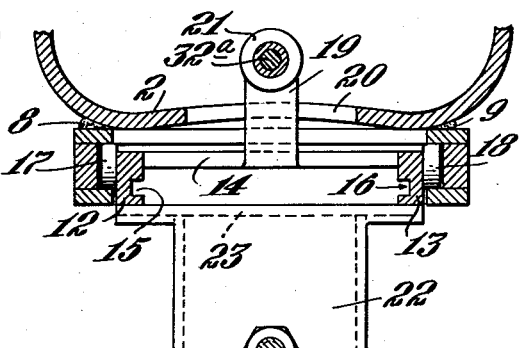
Fig. 8 is a fragmentary horizontal section on the line 8—8 of Fig. 1.
Figure 9:
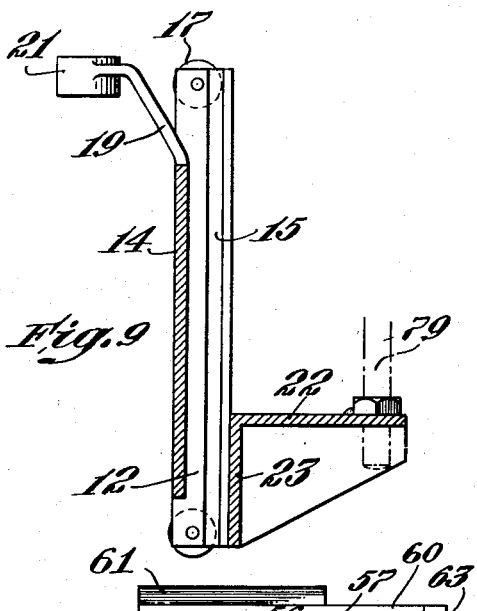
Fig. 9 is a vertical front-to-rear section through the main carriage upon which the shoe supporting devices are mounted.
Figure 11:
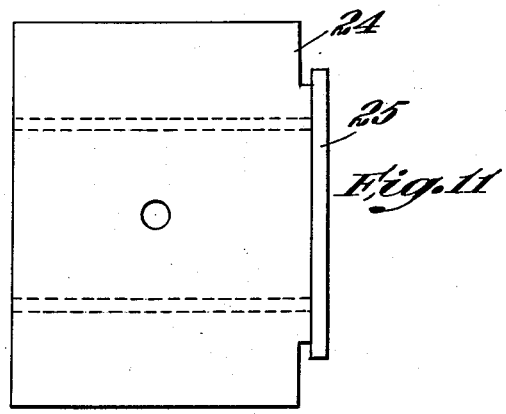
Fig. 11 is a plan view of the secondary carriage.

A carriage is guided for vertical movement by these guideways 10 and 11. This carriage (Fig. 8) comprises spaced vertical side members 12 and 13 united by a rear plate 14, the members 12 and 13 having opposed vertical guide slots 15 and 16 in their inner faces. The members 12 and 13 are provided with studs carrying guide rolls 17 and 18 which travel in the guideways 10 and 11 of the frame F. The rear plate 14 of the carriage has an upwardly extending arm 19 (Figs. 3, 8 and 9) which may be integral with the plate 14 and which inclines upwardly and rearwardly and extends through an aperture 20 (Figs. 5, 7 and 8) in the front wall of the column 2 and which is provided at its rear end with a sleeve member 21 having a vertical bore.

A table 22 (Figs. 3, 8 and 9) having a supporting bracket 23, which is conveniently integral with the table, is secured, for example, by welding or rivets, to the side members 12 and 13 of the carriage.

A second table 24 (Figs. 3, 5, 10 and 11) is arranged above the table 22, the table 24 having a supporting bracket comprising the rear vertical plate 25 whose opposite edges are arranged to slide in the slots 15 and 16 of the carriage.

Inside of the column 2 and adjacent to the inner surface of the front wall of the column there is arranged a vertical post or rod 26 (Figs. 3 and 15) which slides at its lower end in a bearing sleeve 27, here shown as integral with a shelf 28 (Fig. 3) arranged within the lower part of the column and having a supporting bracket 29. This shelf 28 with its bracket may be integral with the column or may be secured to the column as by welding or riveting. At its upper end the rod or shaft 26 (Fig. 15) is provided with a screw threaded axial bore 30. The upper end of the rod 26 is provided with a guide sleeve 31, the lower end of which embraces the upper end of the rod 26 and is fixed to the rod, for example by welding. The upper end of this guide sleeve receives an adjusting member 32 having a screw threaded axial portion 33 which engages the threaded bore 30. The hub 34 of a beveled pinion 35 is pinned to the adjusting member 32, the pinion 35 (Fig. 6) meshing with a bevel gear 36 fixed to a shaft 37 which extends outwardly through a bearing 38 carried by the wall of the column and which is provided with a hand wheel 39 at its outer end. By turning the hand wheel the adjusting member 32 may be rotated relatively to the sleeve 31, thus moving the adjusting member 32 axially relatively to the shaft 26.

The upper end of the adjusting member 32 is provided with an axial socket (Fig. 15) which receives a cylindrical pin 32ª, constituting the effective upper part of the post or rod 26, and coaxial with the member 32, the upper part of the latter turning in a fixed bearing 40 secured to the inner side of the wall of the column 2. Above the bearing 40 the member 32 has two spaced collars 41 and 42 between which the sleeve 21 is arranged, the member 32 passing through the bore in the sleeve. The collars 41 and 42 are pinned to the member 32, thus confining the sleeve 21 between them.

A gear rack 43 (Fig. 3) is fixed to the lower part of the post or rod 26 and meshes with a gear 44 mounted on a shaft 45 which turns in bearings in spaced vertical webs 46 (Figs. 3 and 5) projecting up from and, as here shown, integral with the shelf 28. The gear 44 meshes with a pinion 47 fixed to a shaft 48 which likewise turns in bearings carried by the webs 46, the shaft 48 extending outwardly through the left-hand side wall of the column (Fig. 5) and being provided at its outer end with a treadle arm 49 having the foot-engaging treadle portion 50 at its forward end. An arm 51 (Figs. 3, 29 and 30) is fixed to the shaft 48 within the column and the lower end of a coiled tension spring 52 is secured to the forward end of this arm 51. The upper end of the spring is secured to a fixed hook 53 (Fig. 3) projecting from the inner surface of the column wall.

Figure 12:
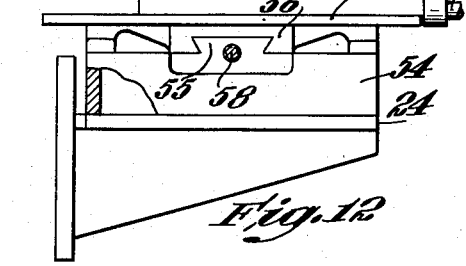
Fig. 12 is a side elevation of the secondary carriage showing the transverse feed table mounted thereon.
Figure 10:
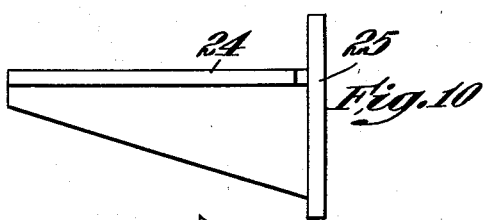
Fig. 10 is a side elevation of the secondary carriage.

A hollow casing 54 (Figs. 1, 2 and 12) is mounted on the table 24, the casing having a transversely extending dovetail guide 55 which engages a complemental guide groove in a part 56 projecting downwardly from a table 57. A shaft 58 turns in bearings in the opposite walls of the casing 54 and has screw threaded engagement with a part carried by the table 57 and which is inside the casing. The shaft 58 extends outwardly to the left of the casing 54 and is provided at its left-hand end with a knurled hand wheel 59 (Fig. 1) by means of which the shaft 58 may be turned. As thus arranged, rotation of the hand wheel 59 moves the table 57 transversely of the machine.

Figure 13:
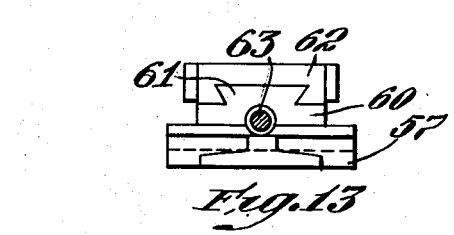
Fig. 13 is a fragmentary front elevation of the front-to-rear feed table.

Mounted on the table 57 is another hollow casing 60 (Figs. 1 and 13) having the dovetailed guide member 61 which engages a complemental guide groove in the lower part of a second table 62. A shaft 63 turns in bearings provided in the casing 60, the shaft having screw threaded engagement with a part of the table 62 located inside of the casing and being furnished with a hand wheel 64 (Fig. 1) at its foward end. By turning the hand wheel the table 62 may be moved from front to rear.

Mounted on the table 62 (Figs. 2, 3 and 14) is a last-supporting jack comprising the base 65 and the post 66 from which project laterally spaced ears 67 (Fig. 1) providing bearings for a shaft 68. A rocker 70 (Fig. 14a) is pivotally supported by the shaft 68 between the ears 67. This rocker 70 has a central aperture in which is located the spindle carrier 69, the latter being pivotally connected to the rocker by a pin 70a so as to rock about a front-to-rear axis. The carrier 69 has vertically elongate slots which receive the opposite ends of a pin 69a fixed in the shaft 68. The last-supporting spindle P is fixed to and projects upwardly from the upper part of the carrier 69. The rocker 70 is provided with a forwardly directed actuating arm 71 (Fig. 14). The forward end of this arm rests upon the peripheral surface of a cam 72 (Figs. 1, 2, 3 and 14) fixed to a shaft 73 having bearings in the post 66. An actuating lever 74 is secured to the forward end of the shaft 73. By swinging the lever, the cam 72 can be turned, and by an engagement with the arm 71 tilts the rocker 69. The peripheral shape of the cam 72 is such that it retains the arm 71 in any position to which it may be adjusted.

Figure 1:
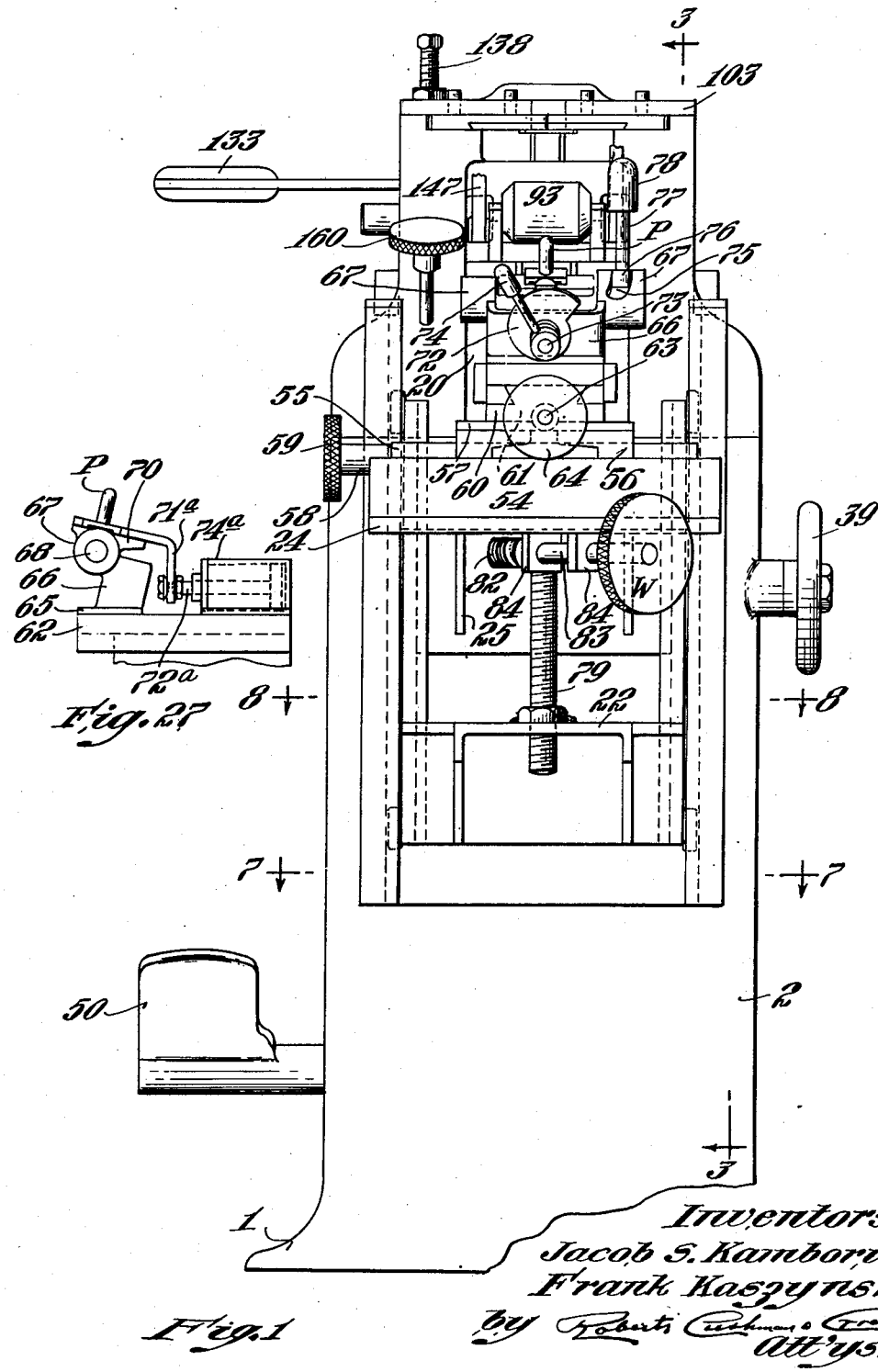
Fig. 1 is a front elevation of the machine, a portion of the base being broken away and with parts omitted.

The shaft 68 is rotatable in the bearings 67 and is also movable axially. As illustrated in Fig. 1, the right-hand bearing 67 is provided with a cam slot 75 which receives a roller 76 mounted on an arm 77 fixed to the shaft 68 and which is provided with a handle 78 at its upper end. By swinging the handle 78 up and down, the roller 76, by engagement with the walls of the cam slot 75, moves the shaft axially and thus tilts the last spindle P transversely.

The alternative construction illustrated in Fig. 27 may be used. As shown in this figure, the rocker 70 has the forwardly and downwardly directed arm 71a whose lower end is forked to receive the forward end of a piston rod 72a secured to a piston which slides in a fluid pressure cylinder 74a. By the controlled admission of pressure fluid to the cylinder 74a the piston is actuated to move the rocker 70.

Figure 16:
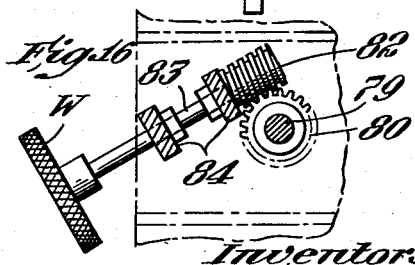
Fig. 16 is a plan view, partly in horizontal section, showing means for adjusting the toe rest.

A post 79 (Figs. 1 and 16) has screw threaded engagement with a threaded opening in the table 22. On the upper end of this post there is fixed a worm wheel 80 which is engaged by a worm 82 fixed to a shaft 83 which turns but is axially immovable in bearings in brackets 84 projecting downwardly from the under side of the table 24. The shaft 83 is provided with a knurled hand wheel W for turning it. By turning the shaft 83, the worm 82 is rotated, thus turning the post 79 and causing the latter to move up and down, and in this way the carriage 24 is adjusted vertically relatively to the table 22.

The pin 32a (Fig. 15), which forms, in effect, an upper section of shaft 26, is provided with a head or enlargement 85 having an upwardly projecting lug 86 of polygonal shape in horizontal section. As here shown this lug is rectangular. The lug 86 fits in a correspondingly shaped socket in the bottom of a transversely elongate box-like support 89 (Fig. 17). As here illustrated this support has spaced parallel bottom bars 87 and 88 (Fig. 15) between which the lug 86 is received. The support 89 comprises spaced end walls 90 (Fig. 17) each having a bearing slot 91 (Fig. 15) open at its upper end, the bearing slots receiving trunnions 92 projecting from the opposite ends of a toe supporting roller 93. This roller may be of any suitable material for example, smoothly polished metal, or it may have a metallic or wooden core with a jacket of other material, for example, vulcanized rubber, a synthetic resin or the like, or alternatively, the jacket may be yieldable material, for example, leather. The rear side 94 of the head 85 is of substantial transverse width and is vertically disposed and smoothly finished and engages a guide bar 95 (Figs. 3, 6 and 15) whose opposite ends are fixed in the side walls of the cap member 5 of the frame. The contact of the surface 94 with the bar or shaft 95 prevents the head 85 from turning, thus maintaining the axis of the roll 93 in the desired transverse position.

A shaft 96 (Fig. 3) is arranged in the rear part of the cap or bonnet 5 of the casing, turning in bearing members 97 and 98 (Fig. 6) carried by the cap. The hub 99 of a segment gear 100 (Fig. 3) is fixed to the shaft 96, the teeth of the segment gear meshing with rack teeth carried by a slide 101 which is guided in a horizontal front-to-rear guideway 102 formed at the under side of a plate 103 which is removably secured to the top 6 of the cap 5.

The forward end of the slide 101 rests upon a wiper support 104 (Figs. 3, 4, 19, 20, 21, 22 and 23) which may, for example be a web integral with the cap 5 and which extends across the cap from one side to the other. This wiper support is provided with a smoothly finished upper surface forming a guide for a pair of wiper actuators 105 and 106 (Fig. 20) whose under surfaces are shaped to provide guideways for the wipers 107 and 108 (Figs. 4 and 19). Each wiper 107 and 108 (Fig. 34) is provided with a slot M at its rear edge, each slot having a recess R in one or both of its opposite side walls. Each actuator 105 and 106 has a hole B (Fig. 20) which receives a stud G (Fig. 5) having a lateral pin K. Normally the stud is disposed in the slot M of the wiper with the pin K in the recess R, and a nut threaded to the upper end of the stud holds the parts in assembled relation. The wiper actuators 105 and 106 are provided with appropriately contoured cam slots 109, 110 and 111, 112, respectively, which receive antifriction rolls 113 and 114 (Figs. 20 and 23) turning on studs projecting upwardly from and fixed to the support 104. The slots in these wiper actuators are of the proper shape to impart the desired wiping movements to the wipers in accordance with the usual practice in the art, and the proper shaping of these slots will be obvious to those familiar with the design of toe lasting machines. As shown in Fig. 23, the studs which carry rolls 113 and 114 may project up above the upper surfaces of the wiper-actuating members and through holes in the plate 103 and are provided with cap nuts 116 at their upper ends.

The forward end of the slide 101 is provided with a cross head 117 (Figs. 4 and 21) to which the rear ends of links 118 and 119 are pivotally connected by studs 120. These links extend forwardly and beneath the wiper actuators 105 and 106 and are pivotally connected to the latter at their forward ends by studs 121 (Fig. 22) provided with anti-friction rolls fitting in bores at the under sides of the actuators. By loosening the nuts (Fig. 35) at the upper ends of the studs G and pushing the studs down to disengage their pins K from the recesses R, the wipers may be withdrawn without disturbing other parts, thus facilitating the substitution of wipers of one size for those of another in accordance with the type of work to be operated on.

The wiper support 104 (Figs. 5, 19 and 21) is shaped to provide a guideway for a trimming blade or cutter 122 (Fig. 26) which is disposed immediately beneath the wipers 107 and 108 and which is guided for movement from front to rear. This blade 122 may be made of sheet steel of appropriate thickness, with its forward end beveled to provide the sharp cutting edge E (Fig. 25). This edge E (Fig. 26) is substantially straight and perpendicular to the general direction of movement of the blade. The opposite lateral edges of the blade are of undulate contour, as shown at 123, and these edges are engaged by anti-friction rolls 124 carried by studs 125 which are fixed to the support 104. When the blade is moved longitudinally, the engagement of the rolls 124 with the edges 123 imparts a rapid transverse vibration to the blade so that its cutting edge E acts with a sawing motion on the material to be trimmed, thus facilitating the trimming operation.

The blade 122 (Fig. 26) is furnished with an opening 126 which receives the upper end 127 (Fig. 25) of a vertical pin 128. This pin is urged upwardly by a spring 129 (Fig. 25) so as normally to keep the upper end of the pin in the opening in the blade. The lower end of the pin is provided with a handle 130 which may be grasped by pulling the pin downwardly so as to disengage its upper end from the blade. When thus disengaged, the blade is free to be withdrawn in a forward direction for sharpening or replacement.

The pin 128 passes through an opening in a horizontal lever 131 (Fig. 24) which is pivoted at 132 to a part carried by the machine frame, the lever extending out through an opening in the left-hand side wall of the frame and being provided with a handle 133 at its left-hand end. A spring 134 is connected at one end to the lever and at its other end to a pin 134ª (Fig. 6) fixed to the frame, the spring tending to swing the lever in a clockwise direction (Fig. 24) thus retracting the cutting blade.

The gear segment 100 (Fig. 3) is provided with a rearwardly directed rigid arm 135 which engages the upper end of a vertical slidable piston rod 136 suitably guided in the frame and whose lower end is connected to a piston (not shown) working in a pressure fluid cylinder 137. A spring 158 tends to turn the segment 100 in a clockwise direction and thus to move the piston rod downwardly, and at the same time to retract the wipers. This cylinder receives pressure fluid from a suitable source, for example, a pump or reservoir, through a conduit 138, the admission of fluid to the cylinder being controlled by a valve 139. This valve, as here illustrated, is a piston valve having the actuating stem 140 which is movable from front-to-rear in a horizontal plane. Normally the valve is closed, and when it is closed, the cylinder communicates with the atmosphere. A lever 141 (Figs. 3, 29, 30, 31 and 32), pivoted at 142 on a fixed bracket, has a rear surface which engages the forward end of the stem 140 so that downward movement of the forward end of the lever 141 pushes the stem 140 rearwardly, thus opening the valve to admit pressure to the cylinder. The lower end of an actuating rod 144 is connected to the forward end of lever 141 by a pivot at the point 143 and extends upwardly (Fig. 3) to the upper part of the frame where it is pivotally connected to a lever 145 whose rear end is fixed to a horizontal shaft 146 journaled at its opposite ends in the frame. The lever 145 extends forwardly and through the opening 20 in the front wall of the frame and is then directed upwardly, as shown at 147, and provided with a pad 148 at its upper end, designed to be engaged by the palm of the operator's hand, who, by depressing the pad 148, swings the lever 141 downwardly, thus admitting pressure fluid to the cylinder 137 and through the described connections actuating the wipers. Preferably there is one of the levers 145, with its pad 148, at each side of the machine, each lever being fixed to shaft 146.

A detent 149 (Figs. 3 and 29 to 32), slotted to straddle the forward edge of lever 141, is pivotally attached to the forward end of the lever 141 by the same pivot 143 which connects the rod 144 to the lever. This detent is urged downwardly about its pivotal support by a spring 150, but is limited in its downward movement, relatively to lever 141, by engagement with the lower forward corner of the latter.

A rocker 151 (Figs. 3 and 29) is fixed to the shaft 48 to which the treadle lever 49 is secured. If desired, the arm 51, above described, may be an integral part of the rocker 151. A pivot pin 152 (Figs. 29-32) projects from the rocker 151 and carries a latch member 153 which is normally held by a spring 154 in engagement with the lower end of a stop screw 156 which turns in a screw-threaded opening in a bracket 157 projecting from the right-hand side of the rocker 151. The upper end of the stop screw 156 is preferably connected by a universal joint to the lower end of an adjusting rod 159 which extends upwardly and through an opening in the front wall of the frame and carries a knurled hand wheel 160 which may be rotated thereby to adjust the stop 156. As illustrated (Fig. 29), the rear end of the latch member 153 is provided with a shoulder 153 which is designed at times to engage the lower corner of the detent 149 and to swing the detent in a clockwise direction.

Referring to Figs. 28 and 33 wherein a modified means for guiding and actuating the last spindle P is illustrated, the jack base 65ª is mounted on the upper carriage 60ª which is moved from front to rear by operating the hand wheel 64, as above described. However, in this instance, the rocker 70', which is supported to turn about a transverse axis, is provided with a rearwardly directed gear segment 170 which meshes with a gear segment 171 pivoted at 172 on the jack post 66ª, and which is provided with a roll 173 which engages the upper surface 174 of a slidable wedge 175. The forward angle of this wedge is very acute so that the wedge may act not only as an actuating device for the segment 171 but also to lock the latter in adjusted position. The wedge 175 slides in a guideway at the upper surface of the carriage 60 and is connected by a link 176 to a piston rod 177 actuated by a piston in a fluid pressure cylinder 177ª mounted on the carriage 60ª. By admitting pressure fluid to the cylinder, the piston rod 177 is moved forwardly, thus moving the wedge 175 and swinging the gear segment 171 so as to swing the rocker 70 and thus tilt the spindle P in a forward direction.

The upper carriage 60ª is mounted to slide along a dovetail guide which slopes upwardly and forwardly, the lower carriage 56ª being of substantially wedge shape having the upwardly and rearwardly inclined surfaces 179 on which the carriage 60ª rests. Thus, when a shoe is mounted in the spindle P and the carriage 60ª is moved forwardly, the shoe is not only moved forwardly but is at the same time elevated by an amount corresponding to the slope of the surface 179.

Preferably, as illustrated in Fig. 33, the lower carriage 56ª is guided by an arcuate dovetail guide 55ª whose center of curvature is at the axis of the post 26 which carries the toe rest 93. With the toe portion of the shoe resting on the toe rest, if the lower carriage 56ª be adjusted transversely, the heel portion of the shoe will be swung from right to left but without substantially changing the position of the toe of the shoe. Thus, the shoe-supporting jack may readily be adjusted for a right or left shoe after it has otherwise been adjusted for the proper size of shoe without substantially disturbing the toe of the shoe.

Another desirable form of last-supporting jack is illustrated in Figs. 36 to 39. Correspondingly numbered parts are similar to those shown in Fig. 1.

As illustrated, the part 54 has a transversely extending dovetail guide member 55 at its top which is received in a correspondingly shaped groove in the base member 56ˣ of the jack. As here illustrated, the guide 55 and its corresponding groove are arcuate like the guide 55ª and groove of Fig. 33. However, the guide and groove may be straight as shown in Fig. 1. The base member 56ˣ is here shown as a hollow casting, and comprises a part having a screw-threaded bore which receives a screw-threaded shaft 58 having bearings in the member 54, the shaft being provided with a handwheel 59 at one end by means of which it may be rotated. By turning the shaft, the base 56ˣ of the jack may be shifted transversely of the machine.

The base 56ˣ has a top 184, here shown as a removable cover plate, which inclines upwardly and forwardly (that is, toward the toe rest), the slope of this top being of the order of 15° to the horizontal. As illustrated in Figs. 37 and 38, this top 184 has a longitudinally extending slot 185 constituting a guideway which receives the lower part of a movable carriage 186 for the last-supporting spindle P. Preferably the carriage 186 is provided with longitudinally extending slots at opposite sides which receive the edges of the top member 184 which define the slot 185, so as to provide a steady support for the carriage as the latter is moved up and down along the guideway. That part 187 of the carriage 186 which is below the top member 184 is provided with a screw-threaded aperture which receives a longitudinal screw-threaded shaft 188 having bearings at its opposite ends in the forward and rear walls of the base 56ˣ. The shaft 188 is provided with suitable collars to prevent its axial movement. At its forward end the shaft 188 has a handwheel 189 by means of which it may be rotated. Rotation of this handwheel moves the carriage 186 up and down along the top member 184 of the base 56ˣ. The carriage 186 is provided with a substantially horizontal upper surface from which the last-supporting pin or spindle P projects.

As illustrated in Fig. 39, lasts L of different sizes (that is, of different lengths) vary in the height of their heel portions so that, when a long last is placed upon the spindle P, the upper surface of its toe portion will be substantially higher than that of a last of smaller size. Thus, if lasts of a series of consecutive sizes were to be placed successively with their toe ends in contact with the toe rest 93, whose position relatively to the wiper 107 has been fixed with relation to the first of the series, it would be necessary, if their forepart portions were to lie in the same plane, that the last-supporting spindle be raised or lowered according to the particular last size. Fig. 39 shows the positions of a series of lasts of different sizes diagrammatically, arranged with their toe ends engaging the toe rest 93. It will be noted that the forward edges 190, 191 and 192 of the heel portions of the last of this series define an inclined plane indicated by the broken line 200—200, and for standard commercial lasts this line is found to make an angle with the horizontal of approximately 15 degrees, 43 minutes. Thus, the angle of slope of the guideway for the carriage 186 should be substantially 15 degrees, 43 minutes, although this exact angle is not essential, providing the slope be such that as the last-supporting spindle is adjusted relatively to the toe rest to take care of lasts of different lengths, it will concomitantly move heightwise of the last to compensate for the corresponding difference in heights of lasts of different lengths.

Thus, by the manipulation of the single handwheel 189, the last-supporting spindle is adjusted both longitudinally of the last and heightwise of the last so as to position the last properly with relation to the toe rest and to the wipers. Transverse adjustment of the last-supporting spindle, for example, to accommodate right and left shoes, is accomplished by actuation of the handwheel 59. The arcuate guideway for the part 55 has its center at the toe rest 93 so that, as the base 60 is adjusted transversely, the last-supporting spindle P will travel in an arcuate path. Thus, the heel end of the shoe will swing without substantially changing the position of its toe end.

Figure 2:
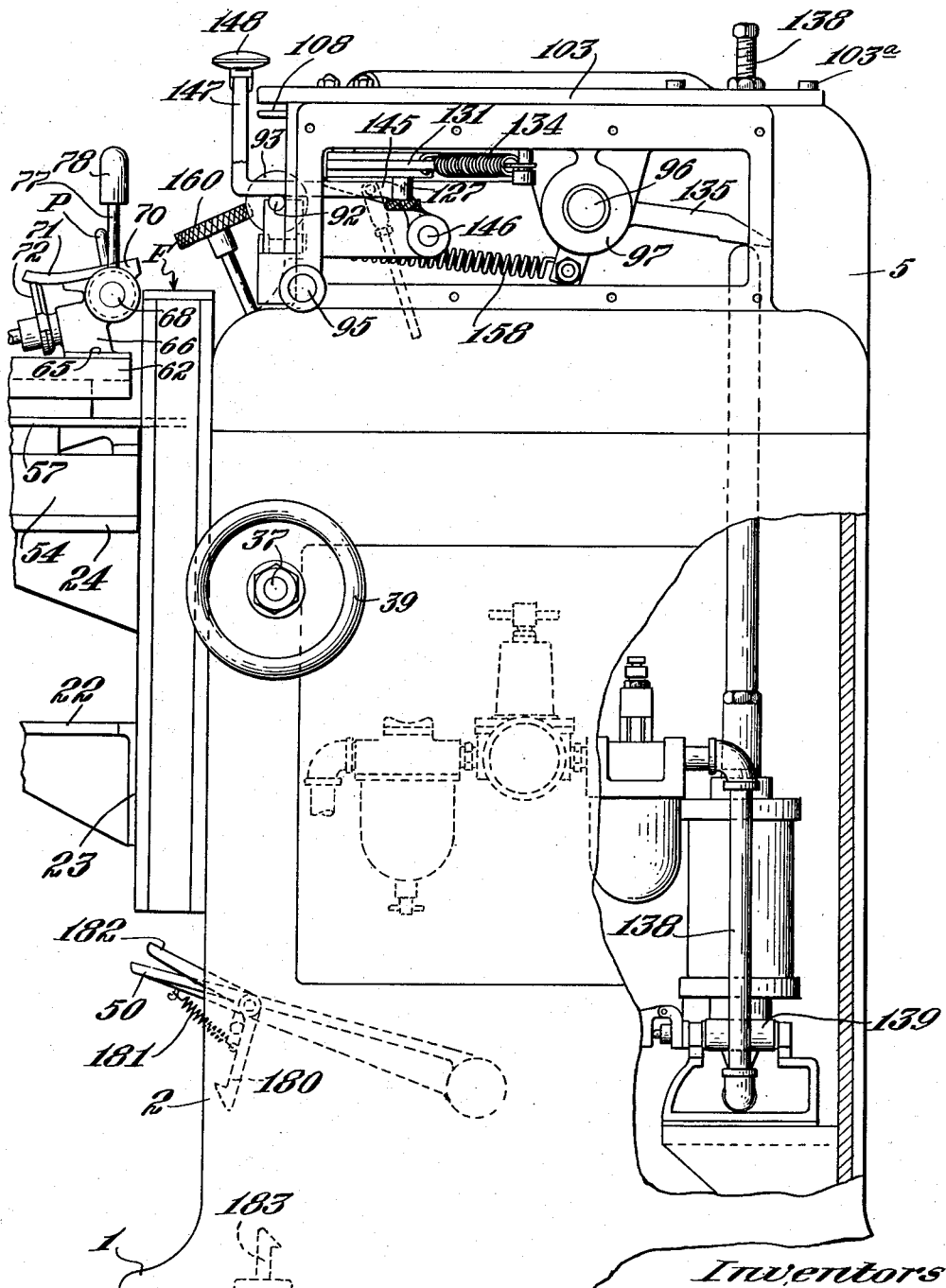
Fig. 2 is a fragmentary elevation of the right-hand side of the machine, a portion of the base being broken away and in section to show the interior and a portion of the upper part of the frame being removed.

In Figs. 2 and 5 the treadle 50 is shown as provided with a retaining latch 180 which is urged forwardly by a spring 181 and which has a foot-actuated arm 182 by means of which it may be swung rearwardly. A fixed detent 183 is engageable by the latch as the treadle is depressed, thereby to hold the treadle in its lower-most position until the latch is released by depression of the arm 182.

Operation

Assuming that the shoe upper has been mounted on the last and is ready for the toe lasting operation, and that the machine is ready for the start of the lasting operation with the wipers fully retracted, the operator mounts the last upon the spindle P with the bottom of the last uppermost and with the toe end of the last directed forwardly or away from the operator and below the wipers and directly above the toe rest 93.

The operator then manipulates the various adjusting elements so as to position the toe portion of the shoe bottom in proper relation to the wipers. Thus, the operator may turn the handwheel W to raise or lower the heel end of the shoe relatively to the toe rest; he may turn the wheel 39 to adjust the toe rest and the heel-supporting spindle relatively to the lower part of the supporting post 29; and he may turn the handwheel 99 to adjust the spindle P transversely thereby to swing the heel end of the shoe from side to side. If, as illustrated in Fig. 33, the support 60 is mounted to swing in an arcuate path, such adjustment swings the heel end of the shoe without substantially changing the lateral position of its toe end, thus accommodating the machine for lasting a right or left shoe; he may turn the handwheel 64 to move the spindle bodily from front to rear to accommodate shoes of different sizes; and he may move the handle 78, thereby to rock the spindle P sidewise so as thereby to level the bottom of the shoe.

Having thus adjusted the last so that the toe end of the shoe bottom is in proper relation to the plane of the wiper movement, the operator manipulates the handle 84 (or actuates the equivalent devices above described), thereby rocking the spindle P forwardly so as to press the toe end of the shoe forcibly down onto the toe rest, the cam 72 or equivalent means locking the parts in this position so that the shoe is held rigidly in place for the commencement of the wiping operation.

The operator now depresses the treadle 50 to its full extent, thus simultaneously elevating the toe and heel supports and raising the shoe bottom to a position above the plane of action of the wipers. During this downward movement of the treadle, the latch 153 moves idly up past the detent 149, the latter merely swinging upwardly to permit the latch to pass, as shown in Fig. 31.

With the shoe thus fully elevated, the treadle is locked by means of the latch so as to relieve the operator of the necessity of holding it down during the preparation of the upper for lasting. With the parts in this position, the operator may draw up the lasting margin at the toe end of the shoe by the use of pincers, particularly if the lasting margin is scant, and then applies adhesive to the inner surface of the lasting margin and to the insole or equivalent element. After thus preparing the upper, the operator spreads the lasting margin outwardly so that it overlies the wipers, holding the margin down by hand or by a suitable hold-down device, so as to increase the grip of the wipers as they advance in performing the wiping operation. The treadle is now permitted to rise so as to lower the shoe to wiping position. As the treadle rises, the latch 153 moves downwardly and contacts the detent 149, thus swinging the lever 141 downwardly (Fig. 32), thereby opening the valve 139 and admitting pressure fluid to the cylinder 137. The wipers are thus advanced by power to perform the inwiping operation. As the wipers advance, the operator may again depress the treadle enough to insure a very substantial pressure of the shoe bottom against the under surface of the advancing wipers. This flattens the lasting margin and insures proper adhesion, while at the same time augmenting the grip of the wipers on the margin as the wipers advance. The inward movement of the wipers under these conditions is sufficient to exert a powerful in-wiping lasting stress upon the shoe upper so that the upper is properly lasted without resort to the customary preliminary up-wiping operation. Thus, damage to the upper, which often results from up-wiping, is avoided. A single forward movement of the wipers may be sufficient to complete the lasting, but the wipers may be caused to advance and retract as many times as desired for completing the lasting operation, either by manipulation of the treadle or by operation of the handles 143. After the inwiping the shoe is lowered slightly and, while the wipers are at least partially advanced, and, preferably, fully advanced, the handle 133 is manipulated thereby to advance the cutting plate 122 so that its forward edge engages the wiped-in upper stock and removes any upstanding folds or wrinkles, thus leaving a smooth bottom which requires no further trimming, pounding or abrasive treatment to place it in readiness for subsequent outer sole application.

After the operation of the blade 122, the treadle is released, the shoe support returns to its initial low position, the handle 74, or its equivalent, is actuated to unlock the last, and the last with the lasted shoe thereon is removed from the spindle, thus placing the machine in condition for a repetition of the lasting cycle.

When a box toe is used, after the first pincering operation, the shoe is lowered to bring the insole just below the plane of the wipers, and the wipers are advanced part way, by operation of the handle 148, to shape the box. The wipers are then retracted and the shoe again elevated above the wipers and surplus toe box material is trimmed away by the use of a hand knife or other appropriate tool so that in the following inwiping operation the lasting margin may be properly engaged by the wipers and subjected to the desired inwiping stress.

The machine, as above described, is simple in construction, the construction being greatly simplified and the number of necessary parts minimized by the fact that the wipers are supported and guided by stationary means so that the connections for actuating the wipers are not required to adapt themselves to varying planes of movement of the wipers. The means for supporting the shoe and for presenting it to the working position are likewise of simple type, and while provision is made for universal adjustment of the shoe relatively to the plane of the wipers, such means is of simple, durable and relatively inexpensive construction. The several adjusting and controlling elements are all located advantageously for the operator, and the mode of operation is so simple that but a very short period of instruction is required in order to instruct a person wholly unskilled in the art in the proper use of the machine and the practice of the process involved.

While certain desirable embodiments of the invention have been illustrated and described by way of example, it is to be understood that the invention is broadly inclusive of any and all modifications falling within the scope of the appended claims.

We claim:

1. A toe lasting machine having a frame, a fixed wiper support carried by the frame, wipers mounted on the support for movement in a predetermined plane, means providing spaced guideways extending substantially perpendicularly to the plane of movement of the wipers, a toe rest and means for guiding it for movement in a path substantially perpendicular to the plane of movement of the wipers, a carriage mounted to slide in said guideways, means connecting the carriage and toe rest for concomitant movement, a last jack supported by the carriage, the jack being movable from front to rear and transversely relatively to the carriage, and means for moving the jack in either of said directions.

2. A toe lasting machine having a frame, a fixed wiper support carried by the frame, wipers mounted on the support for movement in a substantially horizontal plane, means providing spaced guideways extending perpendicularly to the plane of movement of the wipers, a toe rest and means for guiding it for movement in a path substantially perpendicular to the plane of movement of the wipers, a carriage mounted to slide in said guideways, means connecting the carriage and toe rest for concomitant movement, a last jack supported by the carriage, the jack being movable in planes substantially parallel to the plane of movement of the wipers from front to rear and transversely relatively to the carriage, means for so moving the jack, and means for bodily moving the jack up and down relatively to the carriage.

3. A toe lasting machine having a frame, a fixed wiper support carried by the frame, wipers mounted on the support for movement in a substantially horizontal plane, means providing spaced guideways extending perpendicularly to the plane of movement of the wipers, a toe rest and means for guiding it for movement in a path perpendicular to the plane of movement of the wipers, a carriage mounted to slide in said guideways, means connecting the carriage and toe rest for concomitant movement, a last jack supported by the carriage, the jack being movable in planes substantially parallel to the plane of movement of the wipers from front to rear and transversely relatively to the carriage, means for so moving the jack, and means for moving the jack bodily up and down relatively to the carriage, means supporting the jack to rock about a transverse axis, a spindle carried by the jack, and means for rocking the jack about said axis.

4. A toe lasting machine having in combination a frame, movable wipers, a fixed support guiding the wipers to move in a substantially horizontal plane, means carried by the frame defining spaced, vertical guideways, a carriage sliding in the guideways, a toe rest, a vertically slidable support for the toe rest, means for transmitting motion from the sliding support to the carriage, a foot treadle for elevating the sliding support, the carriage being provided with spaced, vertical guideways, an auxiliary carriage mounted in said latter guides, and a last jack supported by the auxiliary carriage.

5. A toe lasting machine having in combination a frame, wipers carried by the frame, a fixed support guiding the wipers to move in a substantially horizontal plane, means carried by the frame defining spaced, vertical guideways, a carriage sliding in the guideways, a toe rest, a vertically slidable post for supporting the toe rest, means for transmitting motion from the post to the carriage, a foot treadle for elevating the post, the carriage being provided with spaced, vertical guides, an auxiliary carriage mounted in said latter guides, a table mounted on the auxiliary carriage to slide transversely of the latter, means for moving the table, a secondary table mounted on the first table to slide from front to rear, means for moving the second table, and a last jack carried by the second table.

6. A toe lasting machine comprising in combination a substantially immovable wiper support, wipers mounted to slide on said support, a jack having a last-supporting spindle, means for moving the jack toward and from the plane of the wipers, means for moving the jack from front to rear, means for moving the jack from side to side, means for rocking the spindle from front to rear, a toe support, means for adjusting the toe support toward and from the plane of the wipers, means for forcibly moving the toe support toward the plane of the wipers, and means for actuating the wipers.

7. A toe lasting machine comprising, in combination, a substantially immovable wiper support, toe wipers mounted to slide on said support, a jack having a last-supporting spindle, a slidable carriage which supports the jack, a slidable post having its axis substantially perpendicular to the plane of movement of the wipers, rigid guides constraining the post to move in a rectilinear path, a toe rest mounted on the post, rigid means connecting the jack-supporting carriage to the post whereby the toe rest and carriage are constrained to move as a unit toward and from the plane of movement of the wipers, a foot treadle, means actuable by the treadle for moving the post thereby to cause the toe rest to approach the plane of the wipers, and power driven means for advancing the wipers.

8. A toe lasting machine comprising in combination a substantially immovable wiper support, toe wipers mounted to slide on said support, a jack comprising a last-supporting spindle, motor means for actuating the wipers, a toe rest movable toward and from the plane of the wipers, a slidable carrier for the toe rest, means constraining said carrier to move in a rectilinear path perpendicular to the plane of movement of the wipers, a carriage for the last-supporting spindle, the carriage being movable toward and from the plane of the wipers, means constraining the carriage and the toe rest to move as a unit, a foot treadle, means actuable by the treadle for moving the toe rest toward the plane of the wipers, means actuable by the same treadle for initiating operation of the motor means, and a spring for moving the toe rest away from the plane of the wipers.

9. A toe lasting machine comprising in combination a substantially immovable wiper support, toe wipers mounted to slide on said support, power actuated means for advancing the wipers, a jack having a last-supporting spindle, a vertically movable toe rest support, a toe rest roll mounted to turn freely in said support, the axis of the roll being horizontal, a slide member which carries the support, rigid guides constraining the slide member to move in a rectilinear path, treadle means for actuating the slide member thereby to cause the toe rest roll to approach the plane of the wipers, and means actuable by the treadle means for initiating operation of the power actuated wiper advancing means.

10. A toe lasting machine comprising in combination a substantially immovable wiper support, wipers mounted to slide on said support, a jack having a last-supporting spindle, a slidable post, guides for the post, a toe rest mounted on the upper end of the post, the post comprising relatively movable upper and lower parts, means for relatively moving the upper and lower parts of the post thereby to adjust the normal position of the toe rest, a rack fixed to the lower part of the post, a gear meshing with the rack, and means for turning the gear thereby to elevate the toe rest.

11. A toe lasting machine comprising in combination a substantially immovable wiper support, horizontally movable wipers mounted to slide on said support, a jack having a last-supporting spindle, a vertically movable carriage for the spindle, a vertically slidable post carrying a toe rest roll, rigid guide means constraining the post to move in a rectilinear path, means constraining the toe rest roll and the spindle carriage to move up and down as a unit, and means for elevating the post thereby to move the toe rest roll toward the plane of the wipers.

12. A toe lasting machine comprising a last supporting jack having a rocking support for a spindle, a spindle carried by the rocking support, the support having a rigid arm projecting therefrom, a pressure fluid motor having a piston rod, and means for transmitting motion from the piston rod to the arm thereby to rock the support.

13. A toe lasting machine comprising in combination a substantially immovable wiper support, wipers mounted to slide on said support, a jack having a last supporting spindle, means guiding the jack to move in a predetermined path, the spindle being pivotally connected to the jack to swing about a transverse horizontal axis, a gear segment fixed relatively to the spindle, a gear element meshing with the gear segment, and power means for turning said gear element thereby to swing the spindle.

14. A toe lasting machine comprising in combination a substantially immovable wiper support, wipers mounted to slide on said support, a jack having a last supporting spindle, means guiding the jack to move in a predetermined path, the spindle being pivotally supported to swing about a transverse horizontal axis, a gear fixed relatively to the spindle, a second gear meshing with the first gear, a wedge for rocking the second named gear, and a fluid motor for moving the wedge thereby to swing the spindle and to lock it in adjusted position.

15. A toe lasting machine comprising in combination a substantially immovable wiper support, horizontally movable wipers mounted to slide on said support, a vertically movable toe rest, a jack having a last-supporting spindle, a carriage for the spindle, a normally fixed base having an upwardly and forwardly inclined top provided with an elongate open slot which forms a guide for a downwardly projecting portion of the spindle carriage, a screw-threaded shaft parallel to said slot and which turns in bearings in said base and which passes through a screw-threaded opening in the aforesaid downwardly projecting portion of the spindle carriage, means for turning the shaft, a hollow casing having a transversely extending arcuate rib which is received in a complemental slot in said base, the center of curvature of the latter slot being directly below the toe rest, means for moving said base along said rib, and a carriage movable up and down as a unit with the toe rest, which supports said hollow casing.

16. A toe lasting machine having a jack which supports the shoe last bottom side up, said machine comprising in combination wipers, means for actuating the wipers, a trimming cutter disposed immediately beneath the wipers, and means for advancing the cutter, and means responsive to advance movement of the cutter for imparting a transverse vibratory movement to the cutter as it advances.

17. A toe lasting machine having a jack which supports the shoe last bottom side up, said machine comprising in combination wipers, means for actuating the wipers, a trimming cutter disposed immediately beneath the wipers and which is movable between the wipers and the bottom of the last, said cutter having a substantially straight cutting edge, means for imparting a cutting stroke to the cutter in a direction substantially perpendicular to its cutting edge, and means, including a part of the cutter, responsive to advance movement of the cutter, for vibrating the cutter in a direction substantially parallel to its cutting edge as it advances.

18. A toe lasting machine comprising in combination wipers, means for actuating the wipers, an elongate trimming blade disposed immediately beneath the wipers, said blade having a substantially straight transverse cutting edge, the blade having undulate longitudinal edges, means for advancing the blade in a direction substantially perpendicular to its cutting edge, and means engaging said undulate edges as the blade advances thereby to impart transverse vibratory motion to the blade.

19. A toe lasting machine comprising a stationary wiper support, wipers mounted thereon, wiper actuators overlying the wipers, means for moving the actuators, an elongate cutting blade disposed between the wipers and the support, said blade having a substantially straight forward cutting edge and undulate lateral edges, studs fixed to the support at opposite sides of the blade, each stud carrying an antifriction roll which engages one of the undulate edges of the blade, and means for advancing the blade in a direction substantially perpendicular to its cutting edge, the engagement of the undulate edges of the advancing blade with the rolls imparting a transverse vibrating motion to the blade.

20. A toe lasting machine comprising a stationary wiper support, wipers mounted thereon, wiper actuators overlying the wipers, means for moving the actuators, an elongate cutting blade disposed between the wipers and the support, said blade having a substantially straight forward cutting edge, and means for advancing the blade in a direction substantially perpendicular to its cutting edge, said blade-advancing means comprising a movable part and a retractable pin carried thereby which normally engages a socket in the blade.

21. A toe lasting machine comprising a stationary wiper support, wipers mounted thereon, wiper actuators overlying the wipers, means for moving the actuators, an elongate cutting blade disposed between the wipers and the support, said blade having a substantially straight forward cutting edge, a manually actuable lever, and a spring-advanced retractable pin normally connecting the blade to the lever.

22. A toe lasting machine comprising in combination a substantially immovable wiper support, toe wipers mounted to slide on said support, a jack having a last-supporting spindle, a vertically movable toe rest, power means including a control valve for actuating the toe wipers, elevating means including a treadle and connections actuated by downward movement of the treadle for elevating the toe rest above the wiping level, and means associated with said elevating means for operating the control valve upon subsequent upward movement of the treadle.

23. A toe lasting machine comprising, in combination, a substantially immovable wiper support, toe wipers mounted to slide on said support, a jack having a last-supporting spindle, a vertically movable toe rest, power means including a control element for operating the wipers, elevating means, including a foot treadle and connections actuated by downward motion of the foot treadle, to lift the toe rest above the wiper level, and means associated with said elevating means for operating the control element upon subsequent upward movement of the treadle.

24. A toe lasting machine comprising, in combination, a substantially immovable wiper support, wipers mounted to slide substantially horizontally on said support, a jack having a last-supporting spindle, a vertically movable toe rest, a foot treadle for elevating the toe rest, a fluid pressure motor for actuating the wiper, a control valve for the motor, means actuable by the treadle for operating the control valve thereby to initiate operation of the motor, and independent manually actuable means for operating the control valve.

25. A toe lasting machine comprising, in combination, a substantially immovable wiper support, wipers mounted to slide on said support, a jack having a last-supporting spindle, a vertically movable toe rest, fluid pressure means including a control valve for actuating the wipers, and a part, actuable by the operator, for positioning the toe rest and concomitantly operating the control valve.

26. A toe lasting machine comprising in combination a substantially immovable wiper support, toe wipers mounted to slide from front to rear on said support, a jack having a last-supporting spindle, a treadle, a vertically movable toe rest, connections actuated by downward motion of the treadle for raising the toe rest to a position above the wiping level, power means for operating the toe wipers, a control element for said power means, manually actuable means for operating said control element, and means automatically operative, in response to a predetermined upward movement of the previously depressed treadle, to operate the control element.

27. A toe lasting machine comprising in combination a substantially immovable wiper support, wipers mounted to slide on said support, a jack having a last-supporting spindle, a vertically movable toe rest, power means for actuating the wipers, and means automatically operative in response to downward movement of the toe rest from its maximum position of elevation to initiate operation of the power means.

28. A toe lasting machine comprising in combination a substantially immovable wiper support, wipers mounted to slide in a front-to-rear direction on said support, a jack having a last-supporting spindle, a vertically movable toe rest, power means for actuating the wipers, a control element for said power means, means for elevating the toe rest to a maximum extent to position the shoe bottom above the plane of the wipers, and means automatically operated upon subsequent depression of the toe rest to actuate the control element and thereby initiate inwiping.

29. A toe lasting machine comprising in combination a substantially immovable wiper support, wipers mounted to slide on said support, a jack having a last-supporting spindle, a vertically movable toe rest, power means for actuating the wipers, a control element for the power means, means for elevating the toe rest to a maximum extent to position the shoe bottom above the plane of the wipers, manually operable means for initiating advance of the wipers by the power means, and means automatically operative upon depression of the toe rest from the position of maximum elevation to operate the control element thereby to advance the wipers.

30. A toe lasting machine comprising in combination a substantially immovable wiper support, wipers mounted to slide on said support, a jack having a last-supporting spindle, a fluid pressure motor for actuating the wipers, a fluid admission valve for the motor, a vertically movable toe rest, a manually actuable lever for opening the admission valve, a detent pivoted to the lever, a foot treadle for raising the toe rest, and an actuating latch movable freely past the detent as the toe rest is raised to maximum elevation, said latch operatively contacting the detent as the toe rest thereafter moves downwardly and thereby opening the admission valve to cause inwiping action of the wipers.

31. A toe lasting machine comprising in combination a substantially immovable wiper support, wipers mounted to slide on said support, a jack having a last-supporting spindle, a fluid pressure motor for actuating the wipers, a fluid admission valve for the motor, a vertically movable toe rest, a manually actuable lever for opening the admission valve, a detent pivoted to the lever, a foot treadle for raising the toe rest, and an actuating latch movable freely past the detent as it is raised to maximum elevation, said latch operatively contacting the detent as the toe rest thereafter moves downwardly and thereby opening the admission valve to cause inwiping action of the wipers, and means for adjusting the initial position of the actuating latch relatively to the detent.

32. A toe lasting machine comprising in combination a substantially immovable wiper support, wipers mounted to slide on said support, a jack having a last-supporting spindle, a motor for actuating the wipers, a movable starting element for the motor, a vertically movable toe rest, a foot treadle for elevating the toe rest, a lever for operating the starting element, a hand-actuated member located adjacent to the wipers for moving said lever thereby to start the motor, and automatic means for operating the starting element, said automatic means comprising a part which moves idly as the treadle is moved to raise the toe rest to its maximum elevation, but which is effective as the toe rest thereafter begins to move downwardly to operate the starting element and thereby to initiate action of the wipers.

JACOB S. KAMBORIAN.
FRANK J. KASZYNSKI.

(References on following page)

References Cited in the file of this patent

UNITED STATES PATENTS

| Number | Name | Date |
|---|---|---|
| 312,962 | Brock | Feb. 24, 1885 |
| 505,671 | Norwood | Sept. 26, 1893 |
| 592,826 | Preston | Nov. 2, 1897 |
| 1,017,124 | Winkley et al. | Feb. 13, 1912 |
| 1,267,370 | Brock | May 28, 1918 |
| 1,274,589 | Pym | Aug. 6, 1918 |
| 1,382,006 | Lund | June 21, 1921 |
| 1,413,697 | Adams | Apr. 25, 1922 |
| 1,487,915 | Brothers | Mar. 25, 1924 |
| 1,522,506 | Froussard | Jan. 13, 1925 |
| 1,563,964 | Carlson | Dec. 1, 1925 |
| 1,702,397 | Baxter | Feb. 19, 1929 |
| 1,717,928 | Kaut | June 18, 1929 |
| 1,737,719 | Hipperson et al. | Dec. 3, 1929 |
| 1,847,334 | Duplessis | Mar. 1, 1932 |
| 1,861,832 | Baxter | June 7, 1932 |
| 1,997,732 | La Chapelle | Apr. 16, 1935 |
| 2,034,037 | Holmgren | Mar. 17, 1936 |
| 2,096,761 | Ricks et al. | Oct. 26, 1937 |
| 2,143,881 | Jorgensen | Jan. 17, 1939 |
| 2,185,941 | Dunn | Jan. 2, 1940 |
| 2,224,157 | Lawson | Dec. 10, 1940 |
| 2,235,888 | Kamborian | Mar. 25, 1941 |
| 2,456,135 | Macdonald | Dec. 14, 1948 |

FOREIGN PATENTS

| Number | Country | Date |
|---|---|---|
| 90,388 | Germany | Feb. 16, 1897 |
| 624,038 | Germany | Jan. 10, 1936 |